US008136803B2

(12) United States Patent
McIntosh et al.

(10) Patent No.: US 8,136,803 B2
(45) Date of Patent: Mar. 20, 2012

(54) ARMOVER CLAMP ASSEMBLY

(75) Inventors: Bruce D. McIntosh, Monroeville, IN (US); Clinton L. Alexander, Fort Wayne, IN (US); Parag Patwardhan, Pune (IN)

(73) Assignee: PHD, Inc., Fort Wayne, IN (US)

( * ) Notice: Subject to any disclaimer, the term of this patent is extended or adjusted under 35 U.S.C. 154(b) by 949 days.

(21) Appl. No.: 12/013,563

(22) Filed: Jan. 14, 2008

(65) Prior Publication Data

US 2008/0179804 A1 Jul. 31, 2008

Related U.S. Application Data

(60) Provisional application No. 60/884,971, filed on Jan. 15, 2007.

(51) Int. Cl.
*B23Q 3/08* (2006.01)
*B25B 1/02* (2006.01)
*B25B 5/08* (2006.01)
*F16D 1/00* (2006.01)

(52) U.S. Cl. ............ 269/32; 269/34; 269/140; 269/229; 403/322.3

(58) Field of Classification Search .................... 269/32, 269/20, 24–27, 229, 228, 140, 142, 235, 269/271, 234; 403/321, 24, 31, 32, 322.3, 403/322.1
See application file for complete search history.

(56) References Cited

U.S. PATENT DOCUMENTS

| | | | |
|---|---|---|---|
| 229,670 | A | 7/1880 | Carrick |
| 294,736 | A | 3/1884 | Hyle |
| 320,436 | A | 6/1885 | Hock |
| 377,114 | A | 1/1888 | Pague |

(Continued)

FOREIGN PATENT DOCUMENTS

DE 853091 10/1952

(Continued)

OTHER PUBLICATIONS

International Search Report, Jul. 1, 2008.

(Continued)

*Primary Examiner* — Lee D Wilson
*Assistant Examiner* — Alvin Grant
(74) *Attorney, Agent, or Firm* — Barnes & Thornburg LLP

(57) ABSTRACT

An armover clamp assembly is provided that includes a housing, an actuator, a cam, a first link, a pivot pin, a driver, a rotating pin, and an arm. The cam includes a cam slot disposed therethrough and is attached to the actuator for linear movement inside the housing. The cam slot has a cam path that includes a locking portion and an extended travel portion. The first link is movably coupled to the cam slot via a cam pin coupled to the link. The cam pin is disposed in and configured to follow the cam path. The pivot pin is coupled to the first link at a position spaced apart from where the cam pin is coupled to the link. The driver is pivotally attached to the pivot pin. The rotating pin extends exterior of the housing and is attached to the driver inside the housing at a location spaced apart from the pivot pin. The arm is attached to the rotating pin exterior of the housing and is rotatable when the actuator linearly moves the cam which causes the cam pin to follow the cam path moving the first link which moves the driver via the pivot pin to rotate the rotating pin.

9 Claims, 7 Drawing Sheets

U.S. PATENT DOCUMENTS

| | | | |
|---|---|---|---|
| 490,150 | A | 1/1893 | Low |
| 659,532 | A | 10/1900 | Jordan |
| 688,230 | A | 12/1901 | Isgrig et al. |
| 669,358 | A | 5/1902 | Wilson |
| 746,360 | A | 12/1903 | McAdams |
| 906,507 | A | 12/1908 | Canedy |
| 1,468,110 | A | 9/1923 | Howe |
| 1,472,566 | A | 10/1923 | Oishei |
| 1,494,033 | A | 5/1924 | Stevens |
| 1,543,037 | A | 6/1925 | Teeter |
| 1,590,227 | A | 6/1926 | Britton |
| 1,929,361 | A | 10/1933 | Liljebladh |
| 1,929,807 | A | 10/1933 | Casper |
| 1,940,258 | A | 12/1933 | Lautz |
| 1,955,226 | A | 4/1934 | Chavannes |
| 1,986,149 | A | 1/1935 | Harris |
| 1,987,987 | A | 1/1935 | Bohmbach |
| 2,081,749 | A | 5/1937 | Kritzler et al. |
| 2,141,945 | A | 12/1938 | Tweedale |
| 2,168,988 | A | 8/1939 | Hultquist |
| 2,188,514 | A | 1/1940 | Moore |
| 2,198,623 | A | 4/1940 | Kastler |
| 2,212,156 | A | 8/1940 | Erdley |
| 2,295,051 | A | 9/1942 | Roth |
| 2,326,962 | A | 8/1943 | Meier |
| 2,381,657 | A | 8/1945 | Eksergian et al. |
| 2,452,406 | A | 10/1948 | Volkery et al. |
| 2,469,542 | A | 5/1949 | Becker |
| 2,499,136 | A | 2/1950 | Edlund et al. |
| 2,565,793 | A | 8/1951 | Weismantel |
| 2,609,113 | A | 9/1952 | Huffman |
| 2,615,682 | A | 10/1952 | Stone |
| 2,651,026 | A | 9/1953 | Roth |
| 2,724,296 | A | 11/1955 | Parrish et al. |
| 2,769,895 | A | 11/1956 | Boord |
| 2,776,168 | A | 1/1957 | Schweda |
| 2,791,623 | A | 5/1957 | Lock et al. |
| 2,796,787 | A | 6/1957 | Aske |
| 2,825,601 | A | 3/1958 | Doty |
| 2,853,905 | A | 9/1958 | Reisacher et al. |
| 2,858,522 | A | 10/1958 | Wengen et al. |
| 2,919,925 | A | 1/1960 | Snyder et al. |
| 2,948,172 | A | 8/1960 | Sloboda et al. |
| 3,061,357 | A | 10/1962 | Wright |
| 3,083,006 | A | 3/1963 | Debs |
| 3,146,982 | A | 9/1964 | Budnick |
| 3,349,927 | A | 10/1967 | Blatt |
| 3,350,132 | A | 10/1967 | Ashton |
| 3,482,830 | A | 12/1969 | Sendoykas |
| 3,519,188 | A | 7/1970 | Erhardt, Jr. |
| 3,568,959 | A | 3/1971 | Blatt |
| 3,570,835 | A | 3/1971 | McPherson |
| 3,613,904 | A | 10/1971 | Blatt |
| 3,630,391 | A | 12/1971 | Wilson |
| 3,635,514 | A | 1/1972 | Blatt |
| 3,664,654 | A | 5/1972 | Manville |
| 3,677,584 | A | 7/1972 | Short |
| 3,712,415 | A | 1/1973 | Blatt et al. |
| 3,734,303 | A | 5/1973 | Blatt |
| 3,759,563 | A | 9/1973 | Kitamura |
| 3,778,094 | A | 12/1973 | Grolet et al. |
| D230,826 | S | 3/1974 | Menshen |
| 3,920,295 | A | 11/1975 | Speckin |
| 3,934,915 | A | 1/1976 | Humpa |
| 3,975,068 | A | 8/1976 | Speckin |
| 4,072,236 | A | 2/1978 | Nomura et al. |
| 4,109,953 | A | 8/1978 | Seymour |
| 4,234,223 | A | 11/1980 | O'Neil |
| 4,275,872 | A | 6/1981 | Mullis |
| 4,307,864 | A | 12/1981 | Benoit |
| 4,355,922 | A | 10/1982 | Sato |
| 4,363,475 | A | 12/1982 | McCarty |
| 4,365,928 | A | 12/1982 | Baily |
| 4,382,572 | A | 5/1983 | Thompson |
| 4,403,801 | A | 9/1983 | Huff et al. |
| 4,453,755 | A | 6/1984 | Blatt |
| 4,462,581 | A | 7/1984 | Mitani |
| 4,473,249 | A | 9/1984 | Valentine et al. |
| 4,475,607 | A | 10/1984 | Haney |
| 4,480,497 | A | 11/1984 | Locher |
| 4,495,834 | A | 1/1985 | Bauer et al. |
| 4,515,336 | A | 5/1985 | Fischer |
| 4,519,279 | A | 5/1985 | Ruggeri |
| 4,529,182 | A | 7/1985 | Valentine |
| 4,596,415 | A | 6/1986 | Blatt |
| 4,610,475 | A | 9/1986 | Heiserman |
| 4,620,695 | A * | 11/1986 | Vanistendael .................. 269/24 |
| 4,626,014 | A | 12/1986 | Vredenbregt et al. |
| 4,650,237 | A | 3/1987 | Lessway |
| 4,703,968 | A | 11/1987 | LaBounty |
| 4,708,297 | A | 11/1987 | Boers |
| D296,546 | S | 7/1988 | Sachs |
| 4,805,938 | A | 2/1989 | Redmond et al. |
| 4,821,719 | A | 4/1989 | Fogarty |
| 4,886,635 | A | 12/1989 | Forster et al. |
| 4,941,481 | A | 7/1990 | Wagenknecht |
| 4,957,318 | A | 9/1990 | Blatt |
| 5,016,850 | A | 5/1991 | Plahn |
| 5,062,756 | A | 11/1991 | McArthur et al. |
| 5,085,480 | A | 2/1992 | Jackson |
| 5,125,709 | A | 6/1992 | Meier, Jr. |
| 5,143,359 | A | 9/1992 | Bush |
| RE34,120 | E | 11/1992 | Plahn |
| 5,215,295 | A | 6/1993 | Hoover |
| 5,242,202 | A | 9/1993 | Ettinger |
| 5,248,177 | A | 9/1993 | Jones et al. |
| 5,261,715 | A | 11/1993 | Blatt et al. |
| 5,271,651 | A | 12/1993 | Blatt et al. |
| 5,280,981 | A | 1/1994 | Schulz |
| 5,284,375 | A | 2/1994 | Land, III |
| 5,291,914 | A | 3/1994 | Bares et al. |
| 5,299,847 | A | 4/1994 | Blatt et al. |
| 5,503,378 | A | 4/1996 | Schauss et al. |
| 5,516,173 | A | 5/1996 | Sawdon |
| 5,536,133 | A | 7/1996 | Velez et al. |
| 5,588,688 | A | 12/1996 | Jacobsen et al. |
| 5,647,625 | A | 7/1997 | Sawdon |
| 5,762,325 | A * | 6/1998 | Blatt .............................. 269/32 |
| 5,853,211 | A * | 12/1998 | Sawdon et al. ............... 294/116 |
| 5,938,259 | A | 8/1999 | Sawdon et al. |
| 6,079,896 | A | 6/2000 | Dellach |
| 6,099,539 | A | 8/2000 | Howell et al. |
| 6,176,533 | B1 | 1/2001 | Moilanen et al. |
| 6,279,886 | B1 * | 8/2001 | Grossart ........................ 269/24 |
| 6,378,855 | B1 | 4/2002 | Sawdon et al. |
| 6,378,856 | B1 | 4/2002 | Takahashi |
| 6,435,494 | B2 | 8/2002 | Takahashi et al. |
| 6,439,560 | B2 | 8/2002 | Sawada et al. |
| 6,458,022 | B1 * | 10/2002 | Folz ............................. 451/365 |
| 6,655,673 | B2 | 12/2003 | Colby |
| 6,666,440 | B2 * | 12/2003 | Yonezawa et al. .............. 269/29 |
| 6,874,834 | B2 | 4/2005 | McIntosh et al. |
| 6,902,159 | B2 | 6/2005 | Sawdon et al. |
| 6,902,160 | B1 * | 6/2005 | Zajac et al. ..................... 269/49 |
| 6,908,077 | B2 * | 6/2005 | Sawdon .......................... 269/32 |
| 7,021,687 | B2 | 4/2006 | Moilanen et al. |
| 7,066,458 | B2 * | 6/2006 | McIntosh et al. ............... 269/34 |
| 7,111,834 | B2 | 9/2006 | Steele et al. |

FOREIGN PATENT DOCUMENTS

| | | | |
|---|---|---|---|
| DE | 2722689 | | 11/1978 |
| DE | 10231221 | A1 | 1/2004 |
| DE | 10329622 | A1 | 1/2005 |
| DE | 102005046976 | A1 | 4/2007 |
| EP | 0288366 | | 4/1988 |
| EP | 0747172 | | 12/1996 |
| EP | 0857547 | | 8/1998 |
| EP | 0928663 | | 7/1999 |
| EP | 1201369 | | 5/2002 |
| EP | 1533149 | A1 | 10/2004 |
| EP | 1491368 | A1 | 12/2004 |
| EP | 1614557 | A2 | 1/2006 |

| | | | |
|---|---|---|---|
| EP | 1902871 | A1 | 3/2008 |
| EP | 1970224 | A1 | 9/2008 |
| GB | 1456703 | | 11/1976 |
| WO | WO9815392 | | 4/1998 |
| WO | WO2005110781 | A1 | 11/2005 |

OTHER PUBLICATIONS

International Search Report, Mar. 18, 2004.

* cited by examiner

0° - CLOSED

6° - OPEN

45° - OPEN

105° - OPEN

ARMOVER CLAMP ASSEMBLY

RELATED APPLICATIONS

The present application is related to and claims priority to U.S. Provisional Patent Application, Ser. No. 60/884,971, filed on Jan. 15, 2007, entitled Armover Clamp and Stop Assembly. The subject matter disclosed in that provisional application is hereby expressly incorporated by reference into the present application.

TECHNICAL FIELD

The present disclosure is related to clamp assemblies that have an external actuated arm extending from an axis of rotation about which the arm pivots.

BACKGROUND AND SUMMARY

Armover clamps are generally known in the art. Such clamps have limited applications, however, because they have a limited range of motion and can only lock at a virtually "closed" position. This means for applications where the jaw arm needs a wider range of motion or a thicker workpiece needs to be gripped, a conventional armover clamp cannot be used without changing the position of the actuator.

An illustrative embodiment of the present disclosure provides an armover clamp assembly that comprises a housing, an actuator, a cam, a first link, a pivot pin, a driver, a rotating pin, and an arm. The cam includes a cam slot disposed therethrough, and is attached to the actuator for linear movement inside the housing. The cam slot has a cam path that includes a locking portion and an extended travel portion. The first link is movably coupled to the cam slot via a cam pin coupled to the link. The cam pin is disposed in and configured to follow the cam path. The pivot pin is coupled to the first link at a position spaced apart from where the cam pin is coupled to the link. The driver is pivotally attached to the pivot pin. The rotating pin extends exterior of the housing and is attached to the driver inside the housing at a location spaced apart from the pivot pin. The arm is attached to the rotating pin exterior of the housing and is rotatable when the actuator linearly moves the cam which causes the cam pin to follow the cam path moving the first link which moves the driver via the pivot pin to rotate the rotating pin.

In the above and other embodiments, the armover clamp may further include: a second link, wherein the first link is attached adjacent a first surface of the cam and the second link is located adjacent a second surface of the cam such that the cam pin is movably coupled to both the first and second links; the housing including an opening that allows access to the cam to manually move the cam without opening the housing to move the arm; the locking portion of the cam path including a linear surface along which the cam pin travels to cause the arm to be capable of closing on a workpiece with a constant force; the extended travel portion of the cam path being angularly oriented with respect to the locking portion so that when the cam pin enters the extended travel portion, it provides rotation of the arm; the linear movement of the cam defining a linear-extending axis wherein the linear surface of the extended travel portion of the cam path is non-perpendicular to the linear-extending axis; wherein the arm has angular travel greater than 100 degrees; the arm being locked into position when it is located between about 0 and about 6 degrees; and the cam path that constitutes the locking and extended travel portions form an L-shaped slot.

Additional features and advantages of the gripper assembly will become apparent to those skilled in the art upon consideration of the following detailed description of the illustrated embodiment exemplifying the best mode of carrying out the gripper assembly as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the armover clamp and such exemplification is not to be construed as limiting the scope of the armover clamp in any manner.

DETAILED DESCRIPTION OF THE DISCLOSURE

Figure 1:
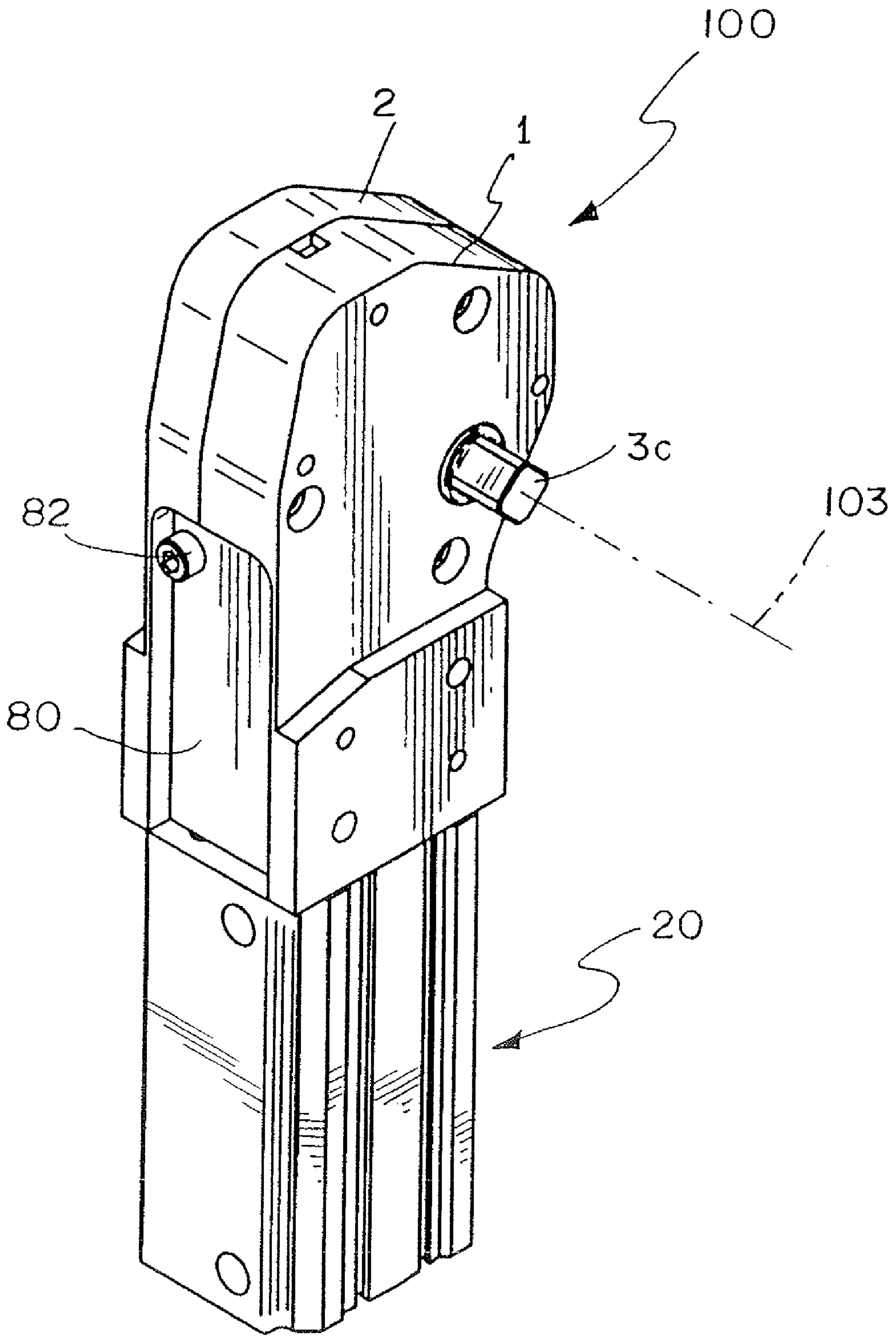
FIG. 1 is a perspective view of an embodiment of an armover clamp.

A perspective view of an illustrative embodiment of armover clamp 100 is shown in FIG. 1. This embodiment includes body portions 1 and 2 attached to actuator 20. It is appreciated that actuator 20 is an illustrative pneumatic cylinder. Fluid such as air is supplied to the actuator which then powers the clamp. Rotating pin 3C illustratively extends from body 1 and is configured to receive an arm for rotating about an axis 103 between first and second positions. In this illustrative embodiment, a slot cover 80 is fastened to assembly 100 via fastener 82 to selectively provide access to the interior of assembly 100.

Figure 2:
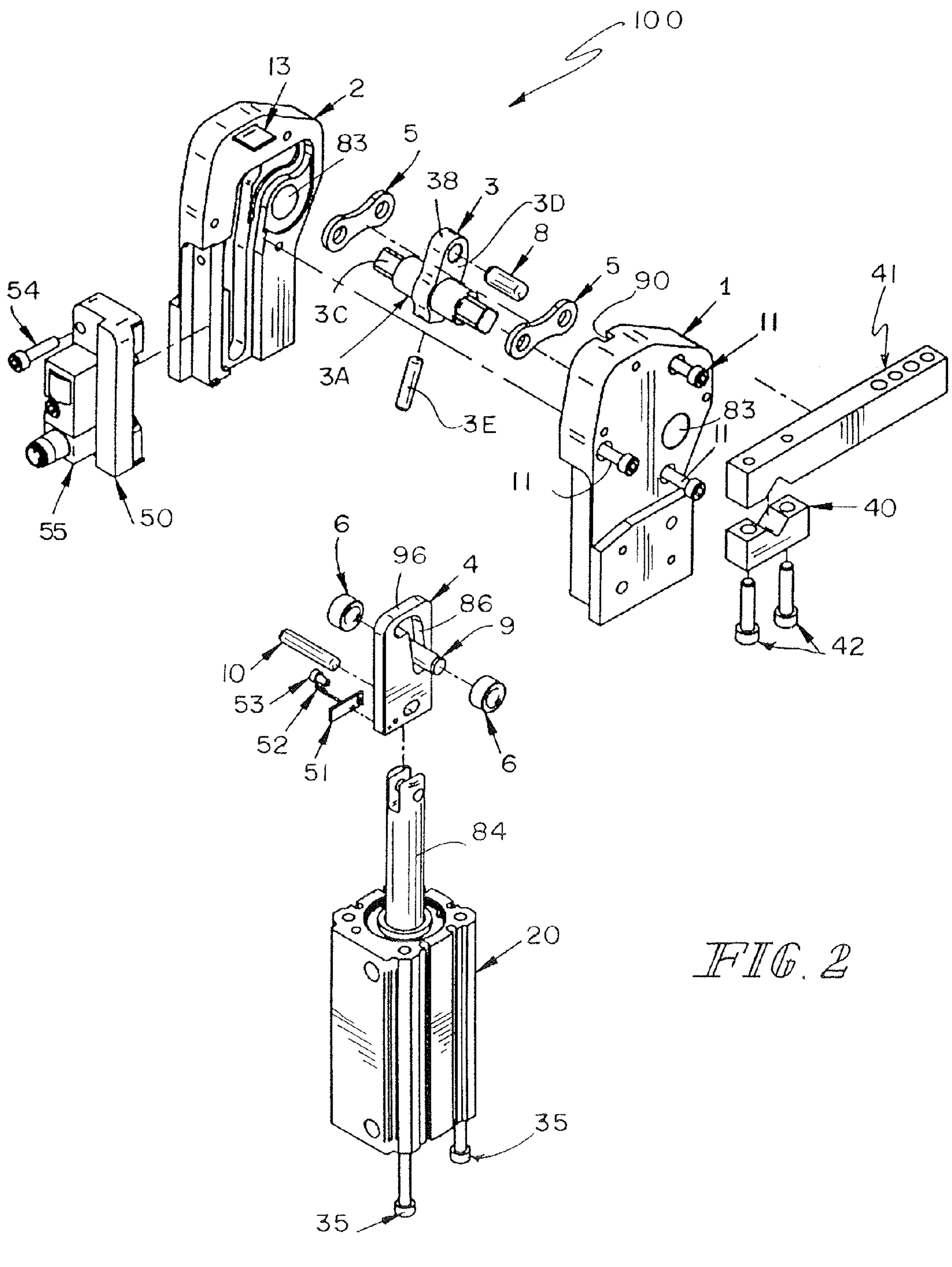
FIG. 2 is an exploded view of the armover clamp of FIG. 1.

An exploded view of armover clamp assembly 100 is shown in FIG. 2. This view shows body portions 1 and 2 being attachable to each other via fasteners 11 and to actuator 20 via fasteners 35. Within bodies 1 and 2, a piston rod 84 attaches to a cam 4 via pin 10. In an illustrative embodiment, an optional sensor switch target 51 can be fastened to cam 4 via fastener 53. Spring pin 52 illustratively orients switch target 51 and prevents it from rotating when attached to cam 4. This embodiment also shows an optional sensor assembly 50 that includes a sensor 55 attached illustratively to body 2 via fastener 54 to detect target 51.

A cam pin 9 is disposed through a cam slot 86 and includes roller bearing 6 attached to the ends thereof. The bearings 6 are configured to fit in a slot 15 which is formed in each of the bodies 1 and 2. In an illustrative embodiment, slots 15 are located adjacent to and follow the same path configuration as cam slot 86 when bodies 1 and 2 are closed. This allows bearings 6 and cam pin 9 to move concurrently as pin 9 moves through cam slot 86.

A link 5 is illustratively provided on each side of cam 4 as shown, and is movably coupled to cam pin 9. These links also movably couple to a link pin 8 illustratively disposed through pinion driver 3B to move the same as further discussed below. Pinion driver 3B also receives pinion shaft 3A which assists in allowing driver 3B to rotate about axis 103. Illustratively, a dowel 3E is disposed in shaft 3A and driver 3B attaching them together. An opening 83 in body 1 is configured to receive pin 3C so that arm 41 can be attached thereto illustratively via arm clamp 40 and fasteners 42. It is appreciated that an opening 83 can be disposed in body 2 as well.

In another embodiment, access from the exterior of bodies 1 and 2 is formed to allow access to assembly 3 or cam 4 to provide a manual override for unlocking arm 41, discussed further herein. When arm 41 locks within a 6 degree region from its closed 0 degree position, opening 90 allows access for a longitudinally extending member, such as a rod, to push against cam 4 moving the same back and unlocking arm 41. In this illustrative embodiment, a cover 13 can be used to selectively cover opening 90 providing access to surface 96 of cam 4. (See also FIGS. 3*c* and 5.) Cover 13 may assist shielding the interior of armover clamp 100 from dust or other contaminants, while being selectively removable so that cam 4 can be accessed and moved to unlock arm 41.

Figure 3A:
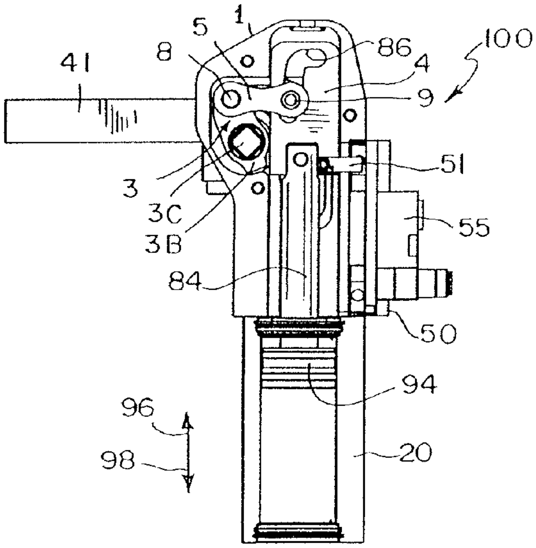
FIGS. 3*a-d* are progression views of an armover clamp depicting the stroke of the clamp's arm between closed and open positions.

Progression views depicting a stroke of arm 41 of armover clamp 100 from an illustratively closed to open position is shown in FIGS. 3*a* through *d*. As shown in FIG. 3*a*, where arm 41 is located in the closed position, it will also be considered to be in the zero degree position. This view also shows how cam pin 9 is located in cam slot 86 at a proximal position to piston rod 84. Since position actuator 20 is an illustrative pneumatic cylinder, it includes a piston 94 located toward the upper end of actuator 20 after traveling in direction 96. With cam pin 9 in the position shown, link 5, which is also attached to pin 8 of drive assembly 3, moves pin 3C to the location shown. Due to the coupling of arm 41 to pin 3C, arm 41 is moved to the 0 degree position as shown.

Figure 3B:
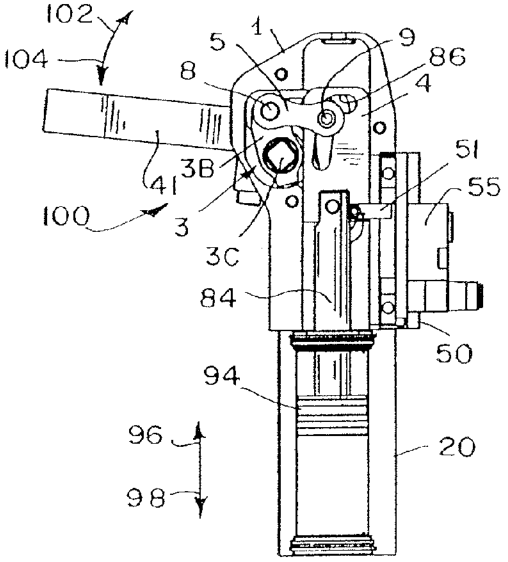

When piston 94 is drawn in direction 98 as shown in FIG. 3*b*, it is appreciated that cam 4 is also drawn in direction 98 via attachment to piston rod 84. As a consequence, cam pin 9 travels along cam path 86 as shown. Again, because of the linkage 5 between cam pin 9 and pin 8, drive assembly 3 is pulled as illustratively shown causing pin 3C to rotate, thereby rotating arm 41 in direction 102. The view in FIG. 3*b* shows arm 41 at an approximate 6 degree angle which represents the locking region for the arm when pressure is lost. In the illustrative embodiment shown, the region between 0 and 6 degrees defines the locking region. As can be appreciated, this region allows for workpieces of larger thicknesses to be gripped and locked by armover clamp 100 than could be held and locked by conventional armover clamps. During operation, however, the force created by the actuator in direction 98 is typically strong enough to overcome the locking force in this region and continues pulling cam 4, thereby rotating arm 41 as shown.

Figure 3C:
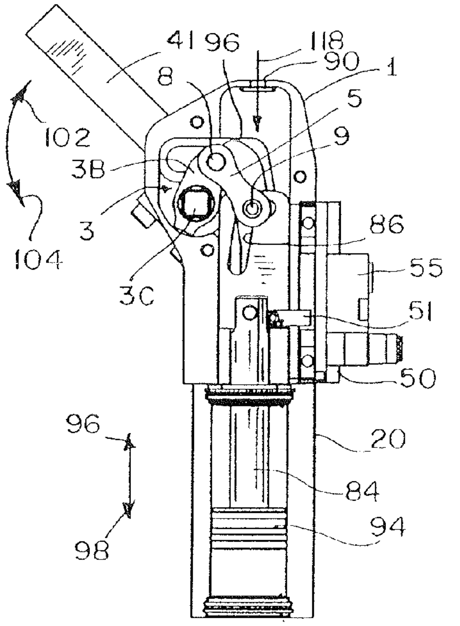

The view shown in FIG. 3*c* depicts piston 94 moving even further in direction 98 pulling cam 4 and rotating arm 41 in direction 102 to an approximate 45 degree angle. Cam pin 9 moves further along cam slot 86 as illustrative shown. Link 5, therefore, pulls further on pin 8 which being offset to axis 103 of driver 3A and pin 3C continues causing the same to rotate. This view also shows how a force from an object like a rod against surface 96 of cam 4 in direction 118 can push cam 4 in direction 98. to rotate arm 41 in direction 102. (See also, FIG. 5*b*).

Figure 3D:
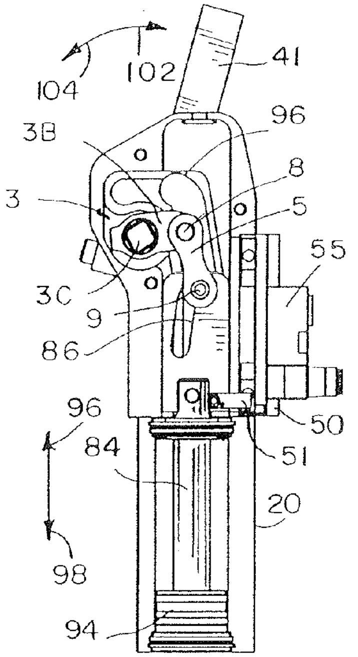

When the end of travel of piston 94 is reached, such as that shown in FIG. 3*d*, cam pin 9 continues to follow cam slot 86. The particular configuration of this cam slot 86 as shown allows arm 41 to experience more rotation during the final stages of travel of piston 94 than during other stages of travel. The effect of this is that arm 41 can rotate to about 105 degrees in this embodiment. The views in FIGS. 3*a*-*d* also show how target 51 moves relative to cam 4 to be detected by sensor 55. This configuration allows the positioning of cam 4 and ultimately arm 41 to be determinable.

Figure 4A:
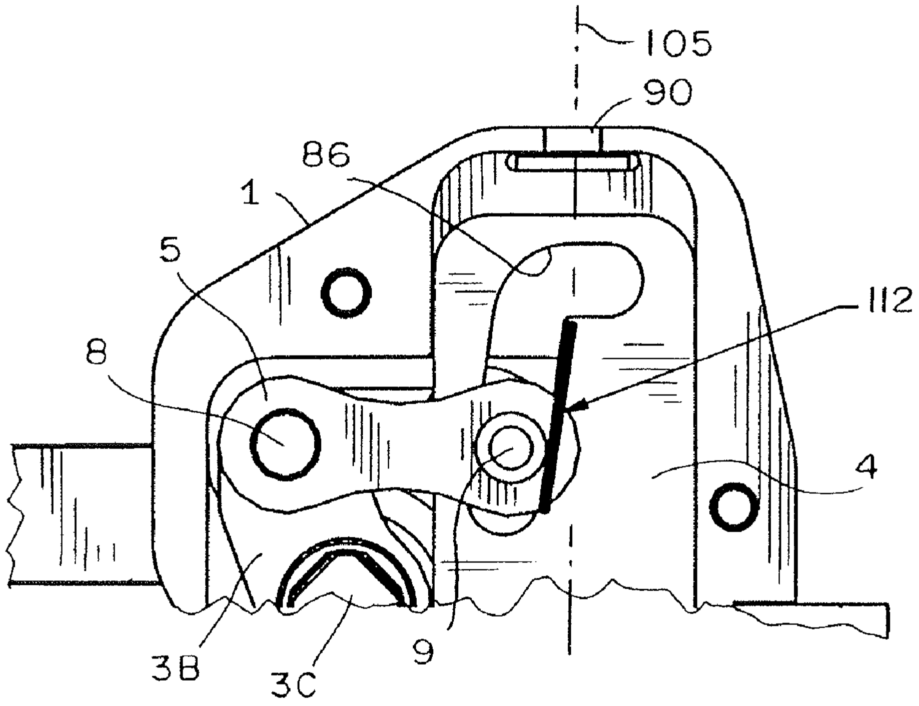
FIGS. 4*a* and *b* are detailed interior views of a portion of the armover clamp showing a cam slot in the cam and the position of a cam pin at different stages of the strokes of the arm.
Figure 4B:
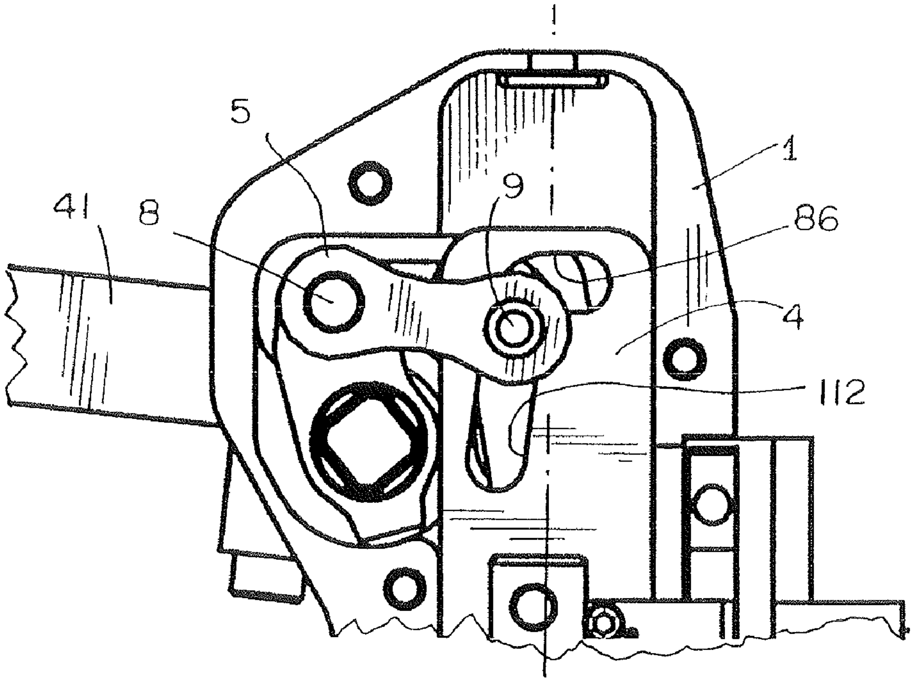
Figure 9:
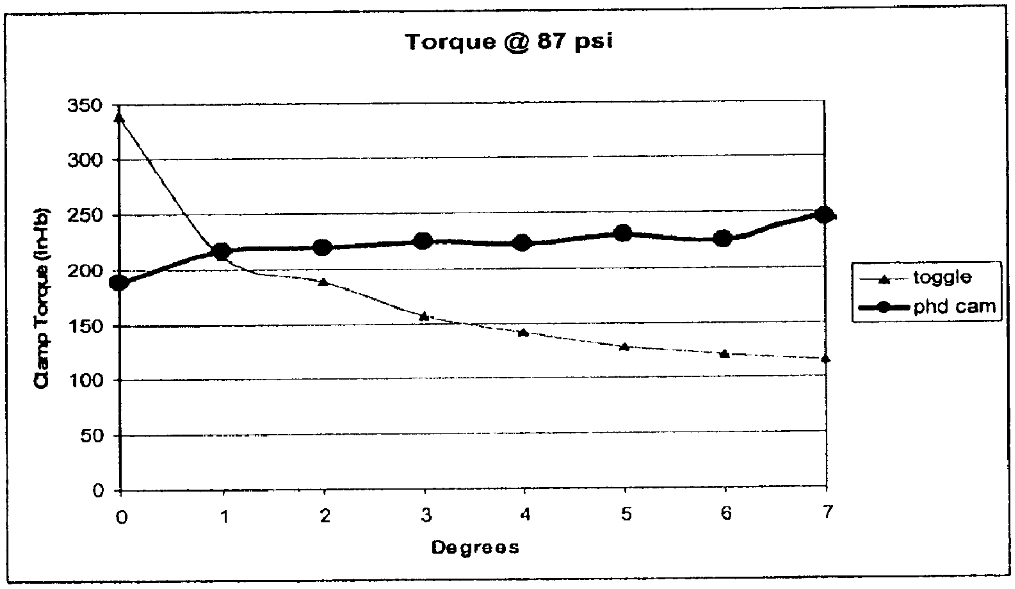
FIG. 9 is a chart comparing the clamp torque between an illustrative clamp according to the present disclosure and the prior art.

With reference to FIGS. 4*a* and *b*, the configuration of the cam slot being oriented at an angle to the illustrative axis 105 shown, not only causes arm 3C to rotate, but also produces a more consistent torque during the range of movement for binding cam pin 9 in slot 86 while in the 6 degree region. This prevents the arm from opening under loss of actuator force. As shown in FIG. 4*a*, a locking or high compression zone 112 is formed in a portion of slot 86. While cam pin 9 is in locking or high compression zone 112 when arm 41 is opening, the force from actuator 20 overcomes any binding of pin 9. When arm 41 is closing and pin 9 is located in locking or high compression zone 112, arm 41 also exerts a consistently high clamping force. For example, the following chart in FIG. 9 compares the clamp torque between an illustrative clamp, according to the present disclosure, and a conventional toggle-linkage prior art clamp over a range of 7 degrees. The chart demonstrates the relative consistency in torque of the present clamp compared to the prior art.

As the chart FIG. 9 shows, when applying a pressure of 87 psi to the actuator, the prior art clamp exhibits high clamping torque right at the zero degree position. The torque drops off substantially through 1 degree and then continues dropping as its arm continues to move. In contrast, the clamp torque of the armover clamp disclosed herein actually shows an increase as it approaches 1 degree and continues that trend extending out to 7 degrees. This demonstrates how a thicker workpiece can be held in the clamp with a greater force than what might otherwise have been accomplished. For example, if a workpiece is held by the arm causing it to remain open between 3 and 4 degrees, there is a greater force applied to the workpiece than would be applied by the tested prior art clamp. Such a conventional prior art clamp needs to clamp a workpiece that allows closure of the arm between 1 and zero degrees to apply a relatively substantial torque. Furthermore, the clamp of the present disclosure may hold a workpiece that requires the arm be open between 6 and 7 degrees substantially as well, as it holds a workpiece that requires the arm be open between 1 and 2 degrees.

Figure 5B:
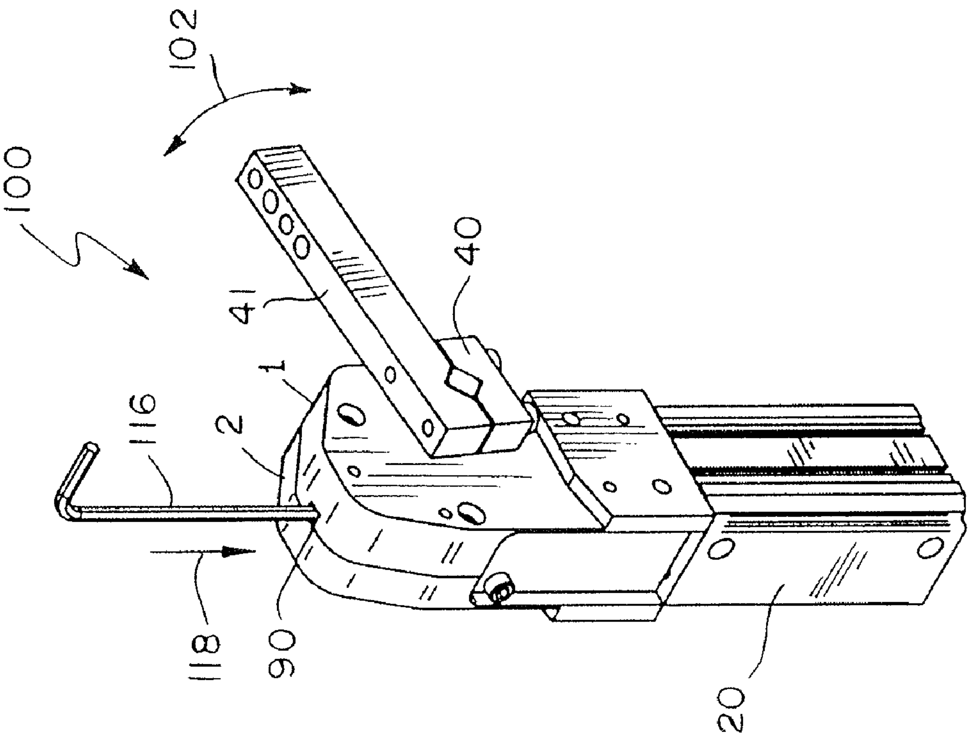
FIGS. 5*a* and *b* are perspective views of an armover clamp assembly showing the locking range of the arm and an unlocking feature of the clamp.
Figure 5A:
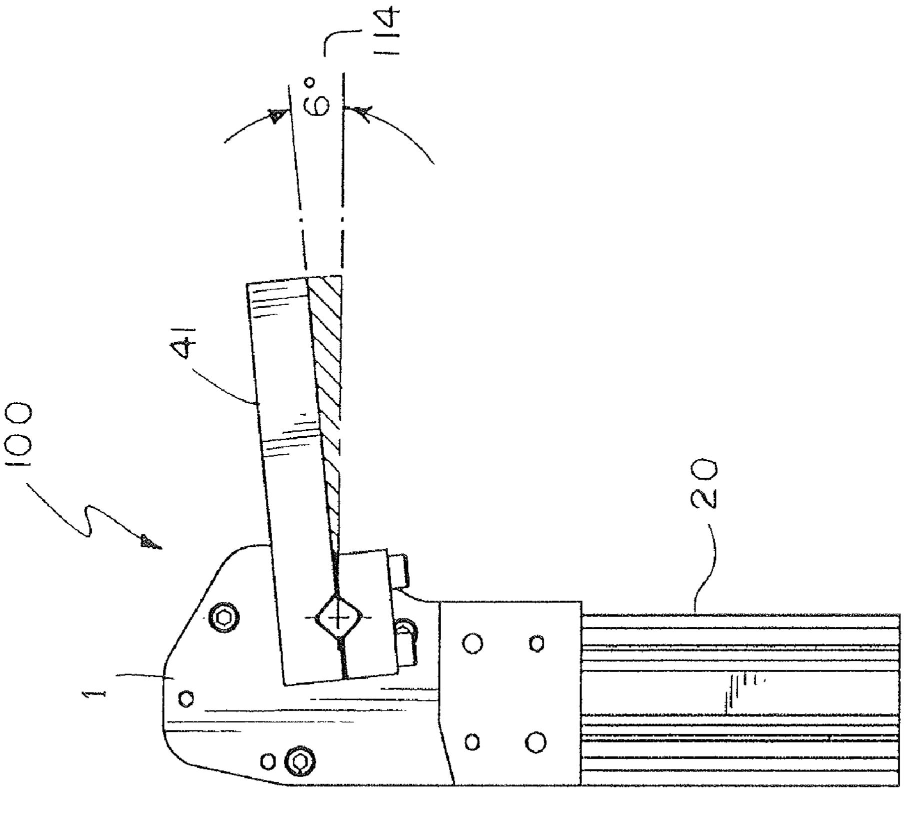

An illustrative embodiment of the present disclosure provides a manual override for arm 41 to release it from the locking position. The locking position range is indicated by reference 114 in FIG. 5*a*. Illustratively, by moving cover 13 and inserting a screwdriver, hex wrench 116, or similar elongated member or rod through opening 90 and into the interior of assembly 100, access to cam 4 is achieved, as shown in FIG. 5*b*. (See also FIG. 3*c*.) By moving wrench 116 in direction 118, it will engage surface 96 of cam 4. Pushing against cam 4 in direction 118 serves to retract cam 4. By doing this, the other structures move as they would if arm 41 was being opened under fluid pressure from piston 94 moving in direction 98. Arm 41 opens and the workpiece is released. It can be appreciated that in other illustrative embodiments cover 13 may not have to be removed, but rather simply pushed out of the way by either attaching to the clamp assembly via hinges, or being flexibly attached to the assembly.

Figure 6:
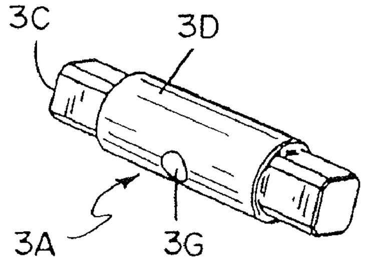
FIG. 6 is a perspective view of a pinion shaft.

A detail perspective view of pinion shaft 3A which includes rotating pin portion 3C and bearing surface 3D is shown in FIG. 6. In the illustrative embodiment, the portions of shaft 3A may be configured differently, because portion 3C of the shaft is used to attach to arm 41, whereas the bearing surface 3D portion may be used to assist rotation of a driver. A bore 3G is illustratively disposed in shaft 3A and is configured to receive dowel pin 3E (see FIG. 2) to secure shaft 3A to driver 3B.

Figure 7:
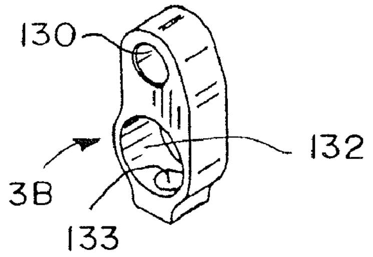
FIG. 7 is a perspective view of an illustrative pinion driver.

A perspective view of an illustrative pinion driver 3B is shown in FIG. 7. Driver 3B illustratively includes bores 130 and 132 to receive link pin 8 and shaft 3A, respectively. It can be appreciated that in other embodiments pin 8 and other structures extending from driver 3B can be integrally formed therewith or attached by any variety of means. A bore 133 is disposed through driver 3B to bore 130 in order to receive pin 3E that is also disposed through bore 3G of shaft 3A to connect the same to driver 3B.

Figure 8A:
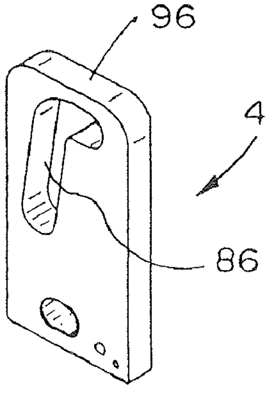
FIGS. 8*a* and *b* are perspective and detailed views of a cam with a cam slot.
Figure 8B:
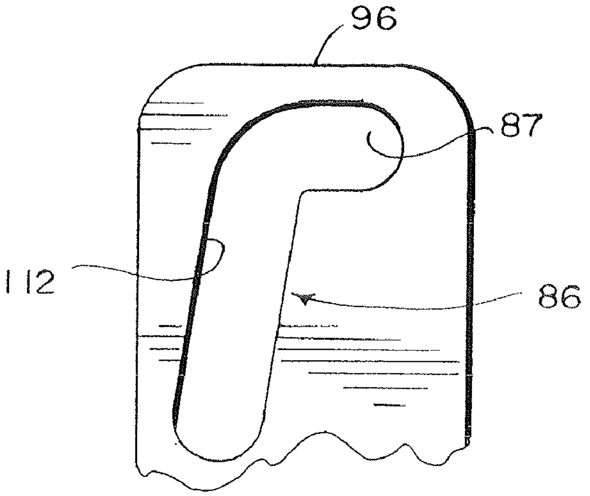

Perspective and detail views of cam 4 including cam slot 86 is shown in FIGS. 8*a* and *b*. These views further depict the illustrative contouring of the cam path formed by slot 86, including the locking or high compression zone 112 and extended travel zone 87. It is appreciated that the path of slot 86 can be modified to affect the movement of jaw arm 41 depending on the particular needs of the clamp.

Although the present disclosure has been described with reference to particular means, materials, and embodiments from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. An armover clamp assembly comprising:

a housing;

an actuator;

a cam having a cam slot disposed therethrough is attached to the actuator for linear movement inside the housing;

wherein the cam slot has a cam path that includes a locking portion and an extended travel portion;

a first link movably coupled to the cam slot via a cam pin coupled to the link;

wherein the cam pin is disposed in and configured to follow the cam path;

a pivot pin coupled to the first link at a position spaced apart from where the cam pin is coupled to the link;

a driver that is pivotally attached to the pivot pin;

a rotating pin that extends exterior of the housing is spaced apart from the first link and is attached to the driver interior of the housing at a location spaced apart from the pivot pin; and an arm that is attached to the rotating pin exterior of the housing and rotatable when the actuator linearly moves the cam which causes the cam pin to follow the cam path moving the first link which moves the driver via the pivot pin to rotate the rotating pin.

2. The armover clamp assembly of claim 1, further comprising a second link, wherein the first link is attached adjacent a first surface of the cam and the second link is located adjacent a second surface of the cam; wherein the cam pin is movably coupled to both the first and second links.

3. The armover clamp assembly of claim 1, wherein the housing includes an opening that allows access to the cam to manually move the cam without opening the housing to move the arm.

4. The armover clamp assembly of claim 1, wherein the locking portion of the cam path includes a linear surface along which the cam pin travels to cause the arm to be capable of closing on a workpiece with a constant force.

5. The armover clamp assembly of claim 4, wherein the extended travel portion of the cam path is angularly oriented with respect to the locking portion so that when the cam pin enters the extended travel portion, it provides rotation of the arm.

6. The armover clamp assembly of claim 5, wherein the linear movement of the cam defines a linear-extending axis, wherein the linear surface of the extended travel portion of the cam path is non-perpendicular to the linear-extending axis.

7. The armover clamp assembly of claim 5, wherein the arm has an angular travel that is greater than 100 degrees from a clamped position.

8. The armover clamp assembly of claim 4, wherein the arm can be locked into position when it is located between about 0 and about 6 degrees from a clamped position.

9. The armover clamp assembly of claim 6, wherein the cam paths that constitute the locking and extended travel portions form an L-shaped slot.

* * * * *